Patented Nov. 6, 1951

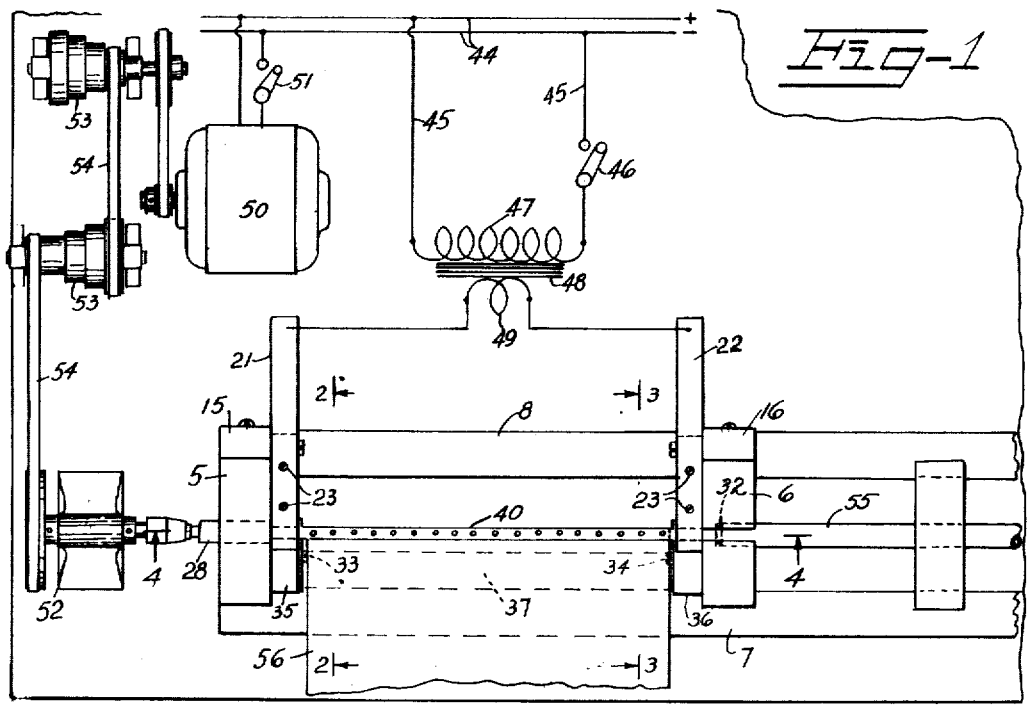
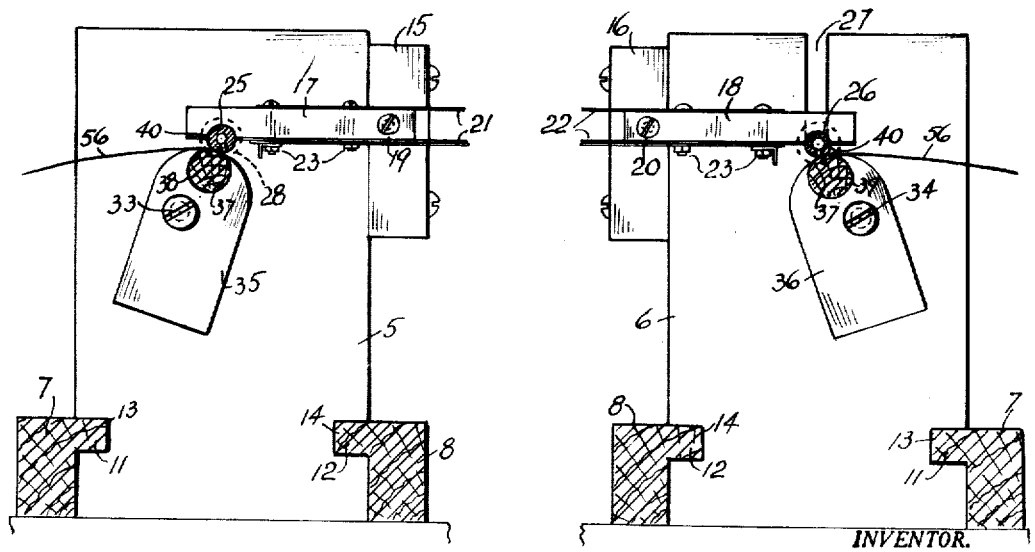

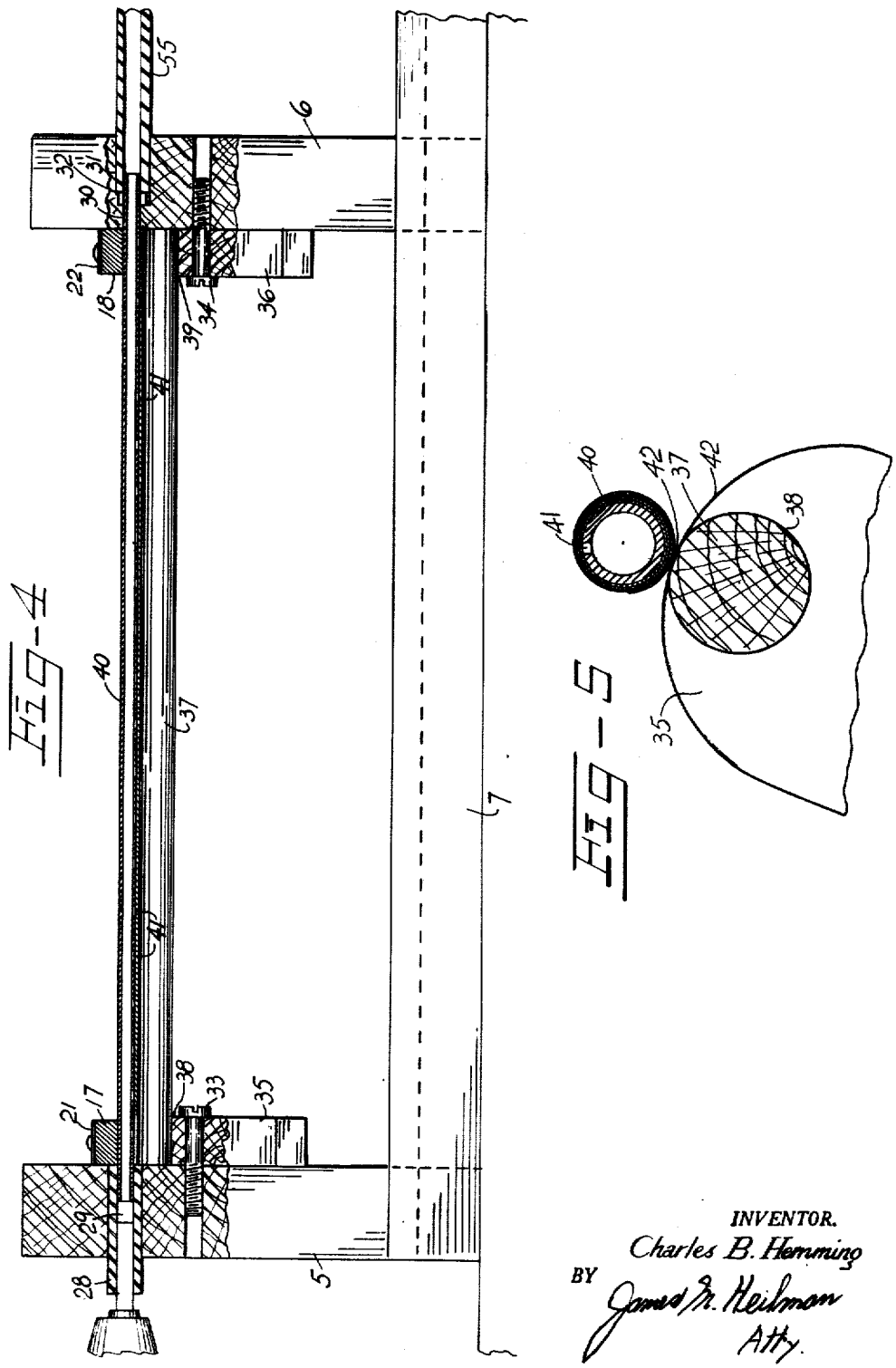

2,574,329

UNITED STATES PATENT OFFICE 2,574,329

PROCESS AND APPARATUS FOR PRODUCING LAMINATED PAPER TUBES

Charles B. Hemming, New Rochelle, N. Y., assignor to United States Plywood Corporation, New York, N. Y., a corporation of New York Application September 22, 1945, Serial No. 618,036

12 Claims. (Cl. 93—81)

This invention relates to process and apparatus for producing and curing paper tubing. It relates more particularly to the production and curing of thin-walled phenolic impregnated paper tubing of the laminated type that is made up of a number of convolutions.

In carrying out the invention paper is impregnated with a resin, the impregnated paper is wound upon a hollow metal mandrel which is heated electrically while the paper is kept tight on the mandrel so that the paper tube is cured very quickly.

The invention may be understood from the description in connection with the accompanying drawings in which Fig. 1 is a plan view of an illustrative embodiment of the invention in which some of the parts are shown somewhat diagrammatically;

Fig. 2 is a section along the line 2—2 of Fig. 1;

Fig. 3 is a section along the line 3—3 of Fig. 1;

Fig. 4 is a longitudinal section on an enlarged scale along the line 4—4 of Fig. 1, and Fig. 5 is a section on an enlarged scale showing some of the parts.

Reference characters 5 and 6 indicate supports or upright members having anchoring means 7 and 8 to keep the supports 5 and 6 in place. These anchoring means 7 and 8 are provided with flanges 11 and 12 that extend into grooves 13 and 14 in the supports 5 and 6. Supports 15 and 16 are provided on the upright members 5 and 6. Electrical contacts 17 and 18, respectively, are pivotally supported on screws 19 and 20 which are attached to the supports 15 and 16. Extensions 21 and 22 are provided on the contacts 17 and 18 for convenience in making electrical connections. Bolts 23 are provided for keeping the extensions 21 and 22 connected to the contacts 17 and 18, respectively. Transverse grooves 25 and 26 are provided along the lower edges of the contact members 17 and 18. A slot 27 is provided at the middle of the upper edge of the support 6, this slot being parallel to the anchoring means 7 and 8. A bearing 28 is anchored in the support 5 and has a longitudinal opening 29 therethrough. A corresponding opening 30 is provided in the support 6 which serves as a bearing. A larger opening 31 extends from the opening 30 to the outside of the support 6. An annular shoulder 32 is provided between the openings 30 and 31.

Screw bolts 33 and 34, Fig. 4, are anchored in holes in the upright members 5 and 6 a short distance from the openings 29 and 30. Pressure-applying members 35 and 36 are pivoted eccentrically on bolts 33 and 34 in supports 5 and 6. A solid shaft or roller 37 is journalled in apertures 38 and 39 near the ends of the pressure members 35 and 36, so that its outer surface is flush with or extends slightly beyond the outer curved ends 42 of pressure members 35 and 36, Fig. 5. A straight rigid hollow tube or mandrel 40 is journalled at one end in the opening 29 in bearing 28 and at the other end in the bearing 30. A row of perforations or openings 41 is provided through the wall of the tube 40 between the bearing 28 and opening 30.

An electric transmission line 44 is connected by leads 45 and switch 46 to the primary 47 of transformer 48 of which the secondary 49 is connected to the extensions 21 and 22.

A motor 50 is connected through switch 51 to line 44. This motor drives pulley 52 through stepped pulleys 53 and belts 54 as indicated.

A hose 55 from a vacuum source, not shown, is attached to the right hand end of the tube 40, this hose being inserted into opening 31 in the support 6. The hose may rotate with the mandrel through a universal connection with the source of vacuum, or may remain stationary and only the mandrel revolve. A sheet of paper 56 of the sort described below, is wound upon the mandrel 40 while this mandrel is heated as described above, and also while the pressure members 35 and 36 and roller 37 keep the paper pressed so that the convolutions are tightly wound and the heat in the tube or mandrel 40 causes the convolutions to adhere closely to make a tube with solid wall structure. In certain instances, the mandrel will be cold when the paper is wrapped on it and will be heated subsequently.

The operation will be specifically described in connection with a particular type of impregnated paper but it is to be understood that the invention is not restricted to this paper. Any material capable of being bent into a tube could be used.

A sulphite paper that has been produced by the cold process after gentle grinding so as to produce very thin paper of high tensile strength and uniform thickness is wound upon the perforated mandrel 40 while the pressure wiping or retarding friction roller 37 is kept pressed against the outer surface of the paper by the pressure-applying members 35 and 36, and is kept heated by the current from secondary 49 of transformer 48. It has been found that sulphite paper known as Mitscherlich is particularly suited for this process. This is paper made by the sulphite cold process and well hydrated. Preparatory to being treated by the present process it is impregnated with phenol-formaldehyde resin that is soluble either in water or alcohol or a mixture of the two. The percentage of the resin to paper may be from about 28% to about 40% with good results.

The operation of my device is as follows: The impregnated uncured paper is wound convolutely and tightly upon the mandrel 40 until sufficient layers are wound on to give the desired wall thickness. The paper is then laminated and the resin cured simultaneously by means of heat. The sheet of paper 56 is then cut transversely. The contact 18 is raised upwardly by pivoting on pivot 20, thereby freeing that end of the mandrel 40 so that it can be lifted out through slot 27 and the formed tube removed after the suction hose is disconnected. The hose and mandrel are replaced and the operation is repeated to produce the next tube.

The pressure or wiping rod 37 and pressure applying members 35 and 36 are desirable in that the same pressure is applied to all the tubes and hence their strength and other characteristics are uniform. However, for limited production or where absolute uniformity of characteristics is not particularly important, the retarding pressure against the sheets on the mandrel may be applied by hand. One method of accomplishing the desired result is to hold a piece of heavy felt or other flexible material by hand against the impregenated paper at one or more places along its length while the mandrel is rotating.

The base and upright members of my invention are shown as being made of wood. Other materials, such as metal, could be used, but insulating members would have to be inserted at appropriate places in the apparatus to prevent a short circuiting of the electrical connections.

One embodiment of my invention has been illustrated.

What I claim is:

1. In a device for producing paper tubing, supporting members, one of said members having a slot therein, a mandrel, one end of the mandrel resting in said slot, said mandrel being hollow and provided with a series of perforations, a vacuum line connected to one end of said mandrel for applying suction to a sheet of paper, means for rotating said mandrel, means connected to said mandrel for conducting electricity to the mandrel in order to heat the same, one of said means being pivotally mounted so as to contact said mandrel in operating position and to permit removal of one side of the mandrel through the slot in the supporting member in open position.

2. In a device for producing paper tubing, supporting members, one of said members having a slot therein, a mandrel, one end of the mandrel resting in said slot, said mandrel being hollow and provided with a series of perforations, a vacuum line connected to one end of said mandrel for applying suction to a sheet of paper, means for rotating said mandrel, means connected to said mandrel for conducting electricity to the mandrel in order to the same, one of said means being pivotally mounted so as to contact said mandrel in operating position and to permit removal of one side of the mandrel through the slot in the supporting member in open position, a pair of gravity weights eccentrically mounted on pivots, a pressure bar fixedly secured to said weights whereby a uniform constant pressure will be applied against the paper being wrapped on said mandrel.

3. In a device for producing paper tubing, supporting members, one of said members having a slot therein, a mandrel, one end of the mandrel resting in said slot, said mandrel being hollow and provided with a series of perforations, a vacuum line connected to one end of said mandrel for applying suction to a sheet of paper, an electric motor for rotating said mandrel, electric contacts connected to said mandrel for forming an electrical path through said mandrel whereby the electricity will heat the same, means for pivotally mounting one of said contacts so that said contact will contact said mandrel in operating position and to permit removal of one side of the mandrel through the slot in the supporting member in open position, said electric motor and said electric contacts connected to the same source of electricity, a pair of gravity weights eccentrically mounted on pivots, a pressure bar fixedly secured to said weights whereby a uniform constant pressure will be applied against the paper being wrapped on said mandrel.

4. The process of producing paper tubing which comprises feeding a sheet of phenol formaldehyde impregnated sulphite paper to a mandrel, applying suction to draw the paper toward the mandrel, heating the mandrel by passing electricity through the walls thereof to fuse and to set the resin in the paper, applying a movable, non-rotatable pressure bar over a small circumferential area at one time but throughout the length of the tube, rotating the mandrel, pivoting one of the electrical heating contacts, raising one end of the mandrel, and removing the finished tubing.

5. The process of producing paper tubing which comprises the steps of feeding resin impregnated paper to a cold mandrel, applying a vacuum to the mandrel, revolving the mandrel while applying the vacuum, wrapping the paper around the mandrel by means of the vacuum, and rapidly heating the mandrel to set the resin and bond together the various plies of the tube.

6. The process of producing paper tubing which comprises the steps of feeding resin impregnated paper to a mandrel, revolving the mandrel while the paper is applied thereagainst, wrapping the paper around the mandrel while applying a retarding force manually, and applying a large current of electricity directly through the mandrel to set the resin in the paper and thereby bond together the various plies.

7. The process of producing paper tubing which comprises the steps of heating a hollow core, perforated mandrel by passing an electric current longitudinally directly through the mandrel, feeding resin impregnated paper to said mandrel, applying a vacuum to the entire inner core of the mandrel, revolving the mandrel while applying the vacuum, and wrapping the paper around the mandrel by means of the vacuum at the same time that the resin impregnant is being made tacky by the heated mandrel.

8. The process as set forth in claim 7 in which the outer plies of the former paper tube will be made to overlie directly the inner plies by feeding the impregnated paper to a rotatable mandrel mounted on a fixed pivot.

9. The process as set forth in claim 8 in which retarding pressure is applied to the plies of the tube as it is being wrapped so as to produce a tight, strong tube.

10. In a device for producing paper tubing, an electricity-conducting mandrel, means for revolving said mandrel around a permanently fixed axis to wrap a sheet of paper thereupon, an electric current source, and a pair of contacting means for connecting said current source to two points spaced along the length of said electricity-conducting mandrel to thereby form a closed electrical circuit longitudinally therethrough so that said mandrel may be directly heated while being revolved.

11. In a device for producing paper tubing, a hollow electricity-conducting mandrel having perforations in the body thereof, means for revolving said mandrel around a permanently fixed axis to wrap a sheet of paper thereupon, means for applying suction to the interior of said hollow mandrel while said mandrel is being revolved, an electric current source, and a pair of contacting means for connecting said current source to two points spaced along the length of said electricity-conducting mandrel to thereby form a closed electrical circuit longitudinally therethrough so that said mandrel may be directly heated while being revolved.

12. In a device for producing paper tubing, a hollow electricity-conducting mandrel having perforations in the body thereof, means for revolving said mandrel around a permanently fixed axis to wrap a sheet of paper thereupon, means for applying suction to the interior of said hollow mandrel while said mandrel is being revolved, pivoted gravity means biased toward engagement with said mandrel for applying wiping pressure to the paper being wrapped on said mandrel, an electric current source, and a pair of contacting means for connecting said current source to two points spaced along the length of said electricity-conducting mandrel to thereby form a closed electrical circuit longitudinally therethrough so that said mandrel may be directly heated while being revolved.

CHARLES B. HEMMING.

REFERENCES CITED

The following references are of record in the file of this patent:

UNITED STATES PATENTS

| Number | Name | Date |
|---|---|---|
| 157,970 | Mottram | Dec. 22, 1874 |
| 652,445 | Skofsrud | June 26, 1900 |
| 1,137,853 | Fortesque | May 4, 1915 |
| 1,569,656 | Kehse | Jan. 12, 1926 |
| 1,921,516 | Frederick | Aug. 8, 1933 |
| 2,250,430 | Wade | July 22, 1941 |

Certificate of Correction

Patent No. 2,574,329 November 6, 1951

CHARLES B. HEMMING

It is hereby certified that error appears in the printed specification of the above numbered patent requiring correction as follows:

Column 3, line 64, after "to", second occurrence, insert *heat*; and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*